United States Patent
He et al.

(10) Patent No.: US 9,779,689 B2
(45) Date of Patent: Oct. 3, 2017

(54) METHOD AND SYSTEM FOR ADJUSTING DISPLAY UNIT

(71) Applicant: Lenovo (Beijing) Co., Ltd., Beijing (CN)

(72) Inventors: Zhiqiang He, Beijing (CN); Zhenhua Zhang, Beijing (CN); Ke Shang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 316 days.

(21) Appl. No.: 14/230,935

(22) Filed: Mar. 31, 2014

(65) Prior Publication Data

US 2015/0029209 A1    Jan. 29, 2015

(30) Foreign Application Priority Data

Jul. 24, 2013   (CN) .......................... 2013 1 0314449

(51) Int. Cl.
*G09G 5/02*  (2006.01)
*G09G 5/10*  (2006.01)
(Continued)

(52) U.S. Cl.
CPC .............. *G09G 5/02* (2013.01); *G06F 1/325* (2013.01); *G06F 1/3206* (2013.01);
(Continued)

(58) Field of Classification Search
CPC .............. G09G 5/02; G09G 230/0666; G09G 2360/144
See application file for complete search history.

(56) References Cited

U.S. PATENT DOCUMENTS

| 8,923,933 B2 | 12/2014 | Hu |
| 2005/0145774 A1 | 7/2005 | Yang et al. |

(Continued)

FOREIGN PATENT DOCUMENTS

| CN | 1638505 A | 7/2005 |
| CN | 201114252 Y | 9/2008 |

(Continued)

OTHER PUBLICATIONS

First Chinese Office Action regarding Application No. 201310314449.0 dated Apr. 5, 2016. English translation provided by Unitalen Attorneys at Law.

(Continued)

*Primary Examiner* — James A Thompson
(74) *Attorney, Agent, or Firm* — Harness, Dickey & Pierce, P.L.C.

(57) ABSTRACT

A method and system for adjusting a display unit are disclosed. The method includes: acquiring first status information of the display unit; determining whether the first status information of the display unit is changed and obtaining a first determining result; switching on the ambient light information acquisition unit in a case that the first determining result indicates that the first status information of the display unit is changed; and adjusting a display parameter of the display unit according to ambient light information acquired by the ambient light information acquisition unit. According to the disclosed method and system, the power consumption of ambient light acquisition unit is reduced, and then the power consumption of the electronic device adopting Paper-looking technology is reduced.

8 Claims, 5 Drawing Sheets

(51) Int. Cl.
*G06F 1/32* (2006.01)
*G06F 3/0346* (2013.01)

(52) U.S. Cl.
CPC .............. *G06F 3/0346* (2013.01); *G09G 5/10*
(2013.01); *G09G 2356/00* (2013.01); *G09G
2360/144* (2013.01); *G09G 2380/14* (2013.01)

(56) References Cited

U.S. PATENT DOCUMENTS

| | | | |
|---|---|---|---|
| 2006/0197735 A1* | 9/2006 | Vuong | G09G 3/3406 345/102 |
| 2008/0165116 A1* | 7/2008 | Herz | G09G 3/3406 345/102 |
| 2009/0027335 A1* | 1/2009 | Ye | G06F 3/017 345/158 |
| 2009/0040170 A1* | 2/2009 | Nilsson | H04N 5/58 345/101 |
| 2010/0026502 A1 | 2/2010 | Yang | |
| 2010/0245309 A1* | 9/2010 | Matsuki | G01J 1/02 345/207 |
| 2011/0069094 A1* | 3/2011 | Knapp | G09G 3/2003 345/690 |
| 2011/0074690 A1* | 3/2011 | Broga | G06F 3/0202 345/169 |
| 2012/0218282 A1* | 8/2012 | Choboter | G09G 5/00 345/589 |
| 2013/0260843 A1 | 10/2013 | Hu | |

FOREIGN PATENT DOCUMENTS

| | | |
|---|---|---|
| CN | 101346755 A | 1/2009 |
| CN | 101640021 A | 2/2010 |
| CN | 201868080 U | 6/2011 |
| CN | 102204232 A | 9/2011 |
| CN | 103002154 A | 3/2013 |
| EP | 1780991 A1 | 5/2007 |

OTHER PUBLICATIONS

Third Chinese Office Action regarding Application No. 201310314449.0 dated Jul. 4, 2017. English translation provided by http://globaldossier.uspto.gov.

* cited by examiner

METHOD AND SYSTEM FOR ADJUSTING DISPLAY UNIT

CROSS REFERENCES OF RELATED APPLICATION

The present application claims the priority to Chinese Patent Application No. 201310314449.0, entitled "METHOD AND SYSTEM FOR ADJUSTING DISPLAY UNIT", filed on Jul. 24, 2013 with the State Intellectual Property Office of People's Republic of China, which is incorporated herein by reference in its entirety.

FIELD

The present disclosure relates to the technical field of sensory control, and in particular to a method and system for adjusting a display unit.

BACKGROUND

Paper-looking, also called paper-like display, is an emerging display technology. The main purpose of this technology is to make a display unit of transmission type or self-luminous type to achieve a paper-like visual display effect. The display indexes of paper are in accordance with the ambient light environment of human eyes, and human eyes encounter less visual fatigue when viewing paper, hence the visual fatigue of human eyes with respect to the display unit of transmission type or self-luminous type may be reduced by using the Paper-looking technology.

The main principle of Paper-looking technology is acquiring chromaticity information of ambient environment by a camera and then adjusting the display parameter of the display unit according to the chromaticity information.

However, conventionally, in the Paper-looking technology the camera is required to be kept in an on-status, and the power consumption of the camera is high, hence the overall power consumption of the electronic device including the camera may increase sharply.

SUMMARY

It is to provide a method and system for adjusting a display unit by which the power consumption of an electronic device adopting Paper-looking technology may be reduced.

In order to achieve the above purpose, a technical solution is provided in the disclosure as follows.

A method for adjusting a display unit, where the display unit includes an ambient light information acquisition unit, the method includes:

acquiring first status information of the display unit;

determining whether the first status information of the display unit is changed and obtaining a first determining result;

switching on the ambient light information acquisition unit in a case that the first determining result indicates that the first status information of the display unit is changed; and adjusting a display parameter of the display unit according to ambient light information acquired by the ambient light information acquisition unit.

Optionally, the process of acquiring first status information of the display unit includes:

acquiring motion status information of the display unit.

Optionally, the process of determining whether the first status information of the display unit is changed includes:

determining whether the display unit is changed from a static status to a moving status.

Optionally, the process of acquiring first status information of the display unit further includes:

acquiring position information of the display unit.

Optionally, the process of adjusting the display parameter of the display unit includes:

acquiring chromaticity information of ambient light;

adjusting chromaticity information of an image displayed on the display unit according to the chromaticity information of ambient light.

Optionally, the method further includes:

detecting an on-status duration of the ambient light information acquisition unit since the ambient light information acquisition unit is switched on;

switching off the ambient light information acquisition unit in a case that the on-status duration is greater than or equal to a first threshold.

Optionally, the method further includes:

detecting an off-status duration of the ambient light information acquisition unit since the ambient light information acquisition unit is switched off;

switching on the ambient light information acquisition unit in a case that the off-status duration is greater than or equal to a second threshold.

A system for adjusting a display unit, where the display unit includes an ambient light information acquisition unit, the system includes:

a first status information acquisition unit, adapted to acquire first status information of the display unit;

a first determining unit, adapted to determine whether the first status information of the display unit is changed and to obtain a first determining result;

a first switch-on unit, adapted to switch on the ambient light information acquisition unit in a case that the first determining result indicates that the first status information of the display unit is changed; and a display parameter adjusting unit, adapted to adjust a display parameter of the display unit according to ambient light information acquired by the ambient light information acquisition unit.

Optionally, the first status information acquisition unit includes:

a motion status information acquisition sub-unit, adapted to acquire motion status information of the display unit.

Optionally, the first determining unit includes:

a first determining sub-unit, adapted to determine whether the display unit is changed from a static status to a moving status.

Optionally, the first status information acquisition unit further includes:

a position information acquisition sub-unit, adapted to acquire position information of the display unit.

Optionally, the display parameter adjusting unit includes:

a chromaticity information acquisition sub-unit, adapted to acquire chromaticity information of ambient light;

a chromaticity information adjusting sub-unit, adapted to adjust chromaticity information of an image displayed on the display unit according to the chromaticity information of ambient light.

Optionally, the system further includes:

an on-status duration detecting unit, adapted to detect an on-status duration of the ambient light information acquisition unit since the ambient light information acquisition unit is switched on; and a switch-off unit, adapted to switch off the ambient light information acquisition unit in a case that the on-status duration is greater than or equal to a first threshold.

Optionally, the system further includes:

an off-status duration detecting unit, adapted to detect an off-status duration of the ambient light information acquisition unit since the ambient light information acquisition unit is switched off; and a second switch-on unit, adapted to switch on the ambient light information acquisition unit in a case that the off-status duration is greater than or equal to a second threshold.

According to the embodiments of the disclosure, the technical effect disclosed by the disclosure is described as follow.

In the method and system for adjusting screen brightness based on ambient light detection according to the disclosure, it may be determined whether the first status information of the display unit is changed. The ambient light information acquisition unit is switched on only if the first status information of the display unit is changed, and the display parameter of the display unit may be adjusted according to the ambient light information. Compared with the conventional technology in which the camera is kept in an on-status all the time, the power consumption of the ambient light information acquisition unit is reduced, hence the power consumption of the device adopting Paper-looking technology may be reduced.

BRIEF DESCRIPTION OF THE DRAWINGS

To make the solutions and embodiments provided by the disclosure better understood by those skilled in the art, the drawings used in the disclosure will be briefly described in the following. Obviously, the drawings described in the following are only a few of the embodiments of the disclosure, and those skilled in the art may obtain other drawings according to these drawings without creatively work.

DETAILED DESCRIPTION

The technical solutions according to the embodiments of the disclosure will be specified in conjunction with the drawings. Obviously, the disclosed embodiments are a few of the embodiments of the disclosure, rather than all of the embodiments. Other embodiments obtained by those skilled in the art without creative work based on the embodiments of the disclosure, fall into the scope of the disclosure.

The disclosure will be specified in the following in conjunction with drawings and embodiments, to make the object, features and advantages of the disclosure better understood.

In the method for adjusting a display unit provided according to the embodiments of the disclosure, Paper-looking technology may be adopted in display unit. The display unit may include an ambient light information acquisition unit. The ambient light information acquisition unit may be a camera or other devices.

Figure 1:
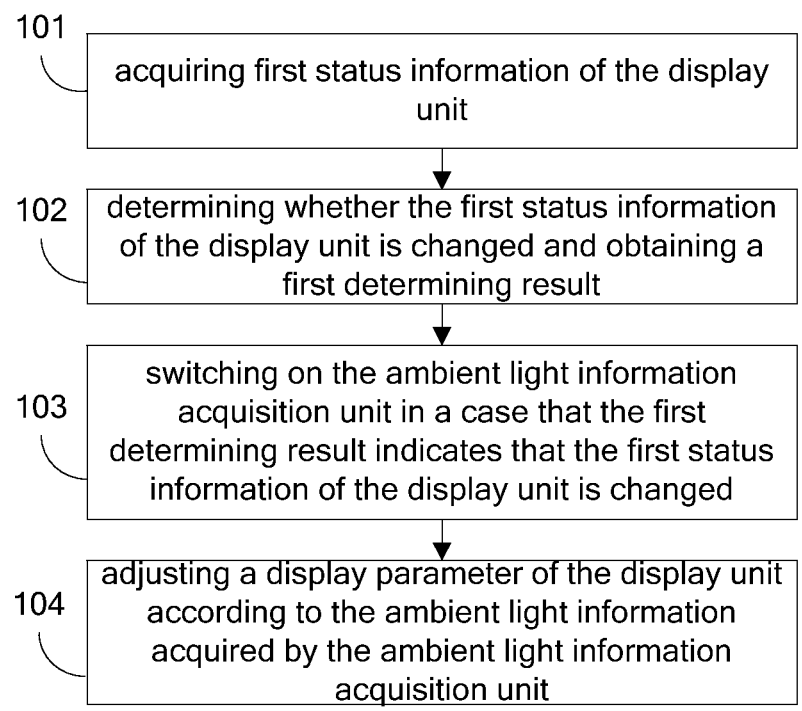
FIG. 1 is a flow chart of a method for adjusting a display unit provided according to the embodiment 1 of the disclosure.

FIG. 1 is a flow chart of a method for adjusting a display unit provided according to the embodiment 1 of the disclosure. As shown in FIG. 1, the method includes steps 101 to 104.

Step 101 is to acquire first status information of the display unit.

The first status information may refer to the information indicating that the position of the display unit is changed. The first status information may include at least motion status information and position information.

In a case that the first status information is the motion status information, the motion status information may be speed information or acceleration information of the display unit. The speed information or acceleration information may be acquired by an accelerometer.

In a case that the first status information is the position information, the position information may be represented by a latitude and longitude coordinate of the position of the display unit. The latitude and longitude coordinate of the display unit may be acquired by a GPS (Global Positioning System) device.

Step 102 is to determine whether the first status information of the display unit is changed and to obtain a first determining result.

In a case that the first status information is motion status information, it may be determined according to the motion status information whether the display unit is changed from a static status to a moving status, and then it may be judged whether the position of the display unit is changed. Generally, the position of the display unit may be changed after the display unit moves for a period of time.

In a case that the first status information of the display unit is acquired by an accelerometer, the determination whether the first status information is changed may depend on whether the acceleration of the display unit is changed from zero to non-zero.

In a case that the first status information of the display unit is acquired by a GPS device, the latitude and longitude coordinate of the display unit may be acquired at a predetermined interval, and then the determination whether the first status information of the display unit is changed may depend on whether the latitude and longitude coordinate is changed.

Step 103 is to switch on the ambient light information acquisition unit in a case that the first determining result indicates that the first status information of the display unit is changed.

In a case that the first status information of the display unit is changed, it is indicated that the position of the display unit is likely to be changed, and the ambient light may be also changed due to the change of position. Therefore, chromaticity information of ambient light may be acquired by the ambient light information acquisition unit, and then a display parameter of the display unit may be adjusted according to the chromaticity information.

Step 104 is to adjust a display parameter of the display unit according to ambient light information acquired by the ambient light information acquisition unit.

The process of adjusting the display parameter of the display unit may include:

acquiring chromaticity information of ambient light; and adjusting chromaticity information of an image displayed on the display unit according to the chromaticity information of ambient light.

Chromaticity is a characteristic of color excluding brightness, and the chromaticity reflects the hue and saturation of the color. By adjusting the chromaticity of the display unit according to the ambient light information, the display unit adopting Paper-looking technology may be more similar to paper in terms of visual effect.

In addition, the process of adjusting the display parameter of the display unit may further include:

adjusting the brightness of the display unit.

The brightness of the display unit may be lowered in a case that the intensity of ambient light decreases; and the brightness of the display unit may be raised in a case that the intensity of ambient light increases.

According to the above description, it may be determined whether the first status information of the display unit is changed, and the ambient light information acquisition unit may be switched on only if the first status information of the display unit is changed; and the display parameter of the display unit may be adjusted according to the ambient light information. Compared with the conventional technology in which the camera is kept in an on-status all the time, the power consumption of the ambient light information acquisition unit is reduced, hence the power consumption of the device adopting Paper-looking technology may be reduced.

Figure 2:
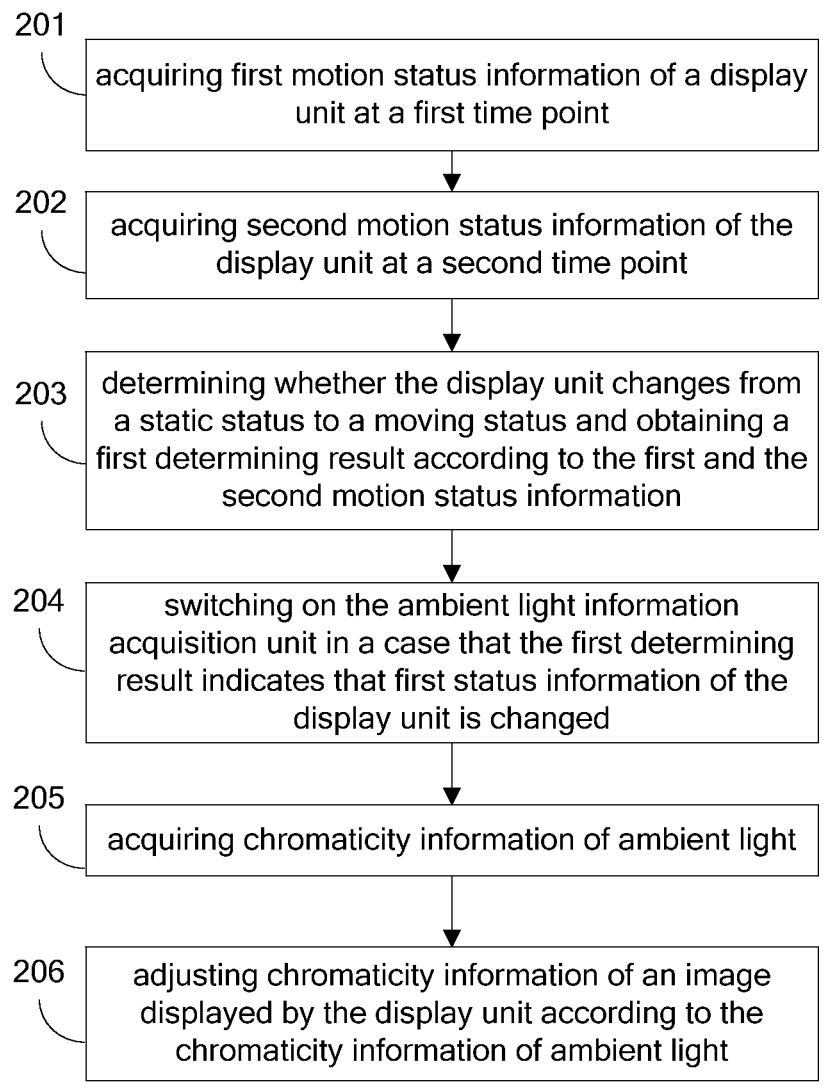
FIG. 2 is a flow chart of a method for adjusting a display unit provided according to the embodiment 2 of the disclosure.

FIG. 2 is a flow chart of a method for adjusting a display unit provided according to the embodiment 2 of the disclosure. As shown in FIG. 2, the method may include steps 201-206.

Step 201 is to acquire first motion status information of a display unit at a first time point;

The first time point may be any time point, in the unit of second.

The motion status information may be speed information or acceleration information.

Step 202 is to acquire second motion status information of the display unit at a second time point;

The second time point is later than the first time point. The time interval between the first and the second time points may be editable, such as 10 s or 20 s. Generally, in a case that the motion duration is less than 10 s, the display unit is still in a certain area of a certain environment space although the position of the display unit is changed. For example, the display unit is taken from one area to another area in a room; in that case, the display unit is still in the same room although the position of the display unit is changed; hence the ambient light may not change a lot.

Step 203 is to determine whether the display unit is changed from a static status to a moving status and then obtain a first determining result according to the first and the second motion status information;

In a case that motion status information is speed information, the change of motion status may be judged as follows.

It is judged whether a moving speed indicated in the second motion status information is non-zero in a case that the moving speed indicated in the first motion status information is zero, where it is indicated that the display unit is changed from a static status to a moving status in a case that the moving speed is changed from zero to non-zero.

It is judged whether a moving speed indicated in the second motion status information is equal to a moving speed indicated in the first motion status information in a case that the moving speed indicated in the first motion status information is non-zero, where it is indicated that the display unit is changed from a static status to a moving status in a case that the moving speed indicated in the second motion status information is not equal to the moving speed indicated in the first motion status information.

In practice, the display unit may be aboard a train or other vehicles moving at a constant speed. The environment in a carriage is relatively enclosed, and the ambient light in the carriage may not change a lot; therefore, the display unit may be determined to be changed from a static status to a moving status in a case that the moving speed of the display unit changes from one constant speed to other speed, and then it may be determined that the environment of the display unit is changed.

Step 204 is to switch on the ambient light information acquisition unit in a case that the first determining result indicates that first status information of the display unit is changed.

Step 205 is to acquire chromaticity information of ambient light.

Step 206 is to adjust chromaticity information of an image displayed on the display unit according to the chromaticity information of ambient light.

Figure 3:
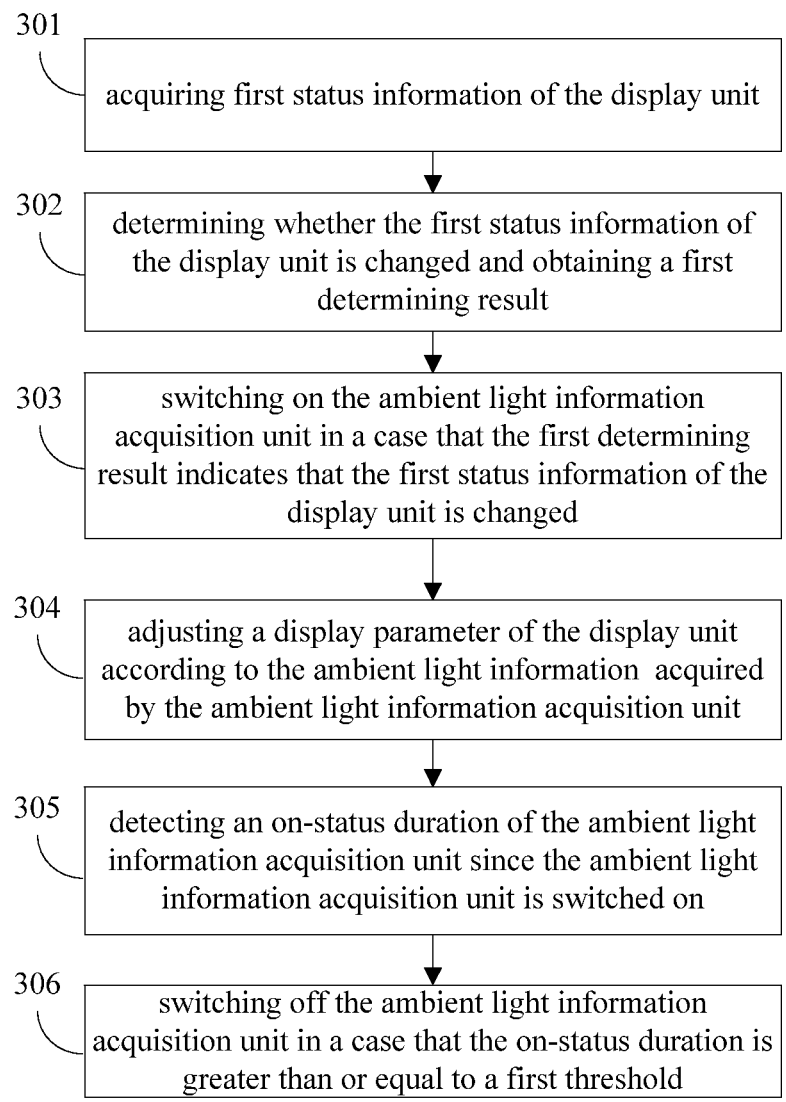
FIG. 3 is a flow chart of a method for adjusting a display unit provided according to the embodiment 3 of the disclosure.

FIG. 3 is a flow chart of a method for adjusting a display unit provided according to the embodiment 3 of the disclosure. As shown in FIG. 3, the method may include steps 301-306.

Step 301 is to acquire first status information of the display unit;

Step 302 is to determine whether the first status information of the display unit is changed and to obtain a first determining result;

Step 303 is to switch on the ambient light information acquisition unit in a case that the first determining result indicates that the first status information of the display unit is changed;

Step 304 is to adjust a display parameter of the display unit according to the ambient light information acquired by the ambient light information acquisition unit;

Step 305 is to detect an on-status duration of the ambient light information acquisition unit since the ambient light information acquisition unit is switched on;

Step 306 is to switch off the ambient light information acquisition unit in a case that the on-status duration is greater than or equal to a first threshold.

The threshold may be 1 minute, 5 minutes or 10 minutes, etc., which may be set as required.

In certain scenarios, the display unit may be kept in a moving status. For example, the display unit is carried by a user when traveling on automobile or other vehicles, and hence the motion status of the display unit may keep changing. However, since the display unit is in the automobile or vehicle all the time, the ambient light may not change a lot, hence there is no need to keep the ambient light information acquisition unit in an on-status all the time, or to keep adjusting the display parameter of the display unit all the time.

In this embodiment, the on-status duration of the ambient light information acquisition unit is detected to avoid the above problems. The ambient light information acquisition unit may be switched off in a case that the on-status duration is greater than or equal to the first threshold, hence the power consumption of the display unit may be further reduced.

Figure 4:
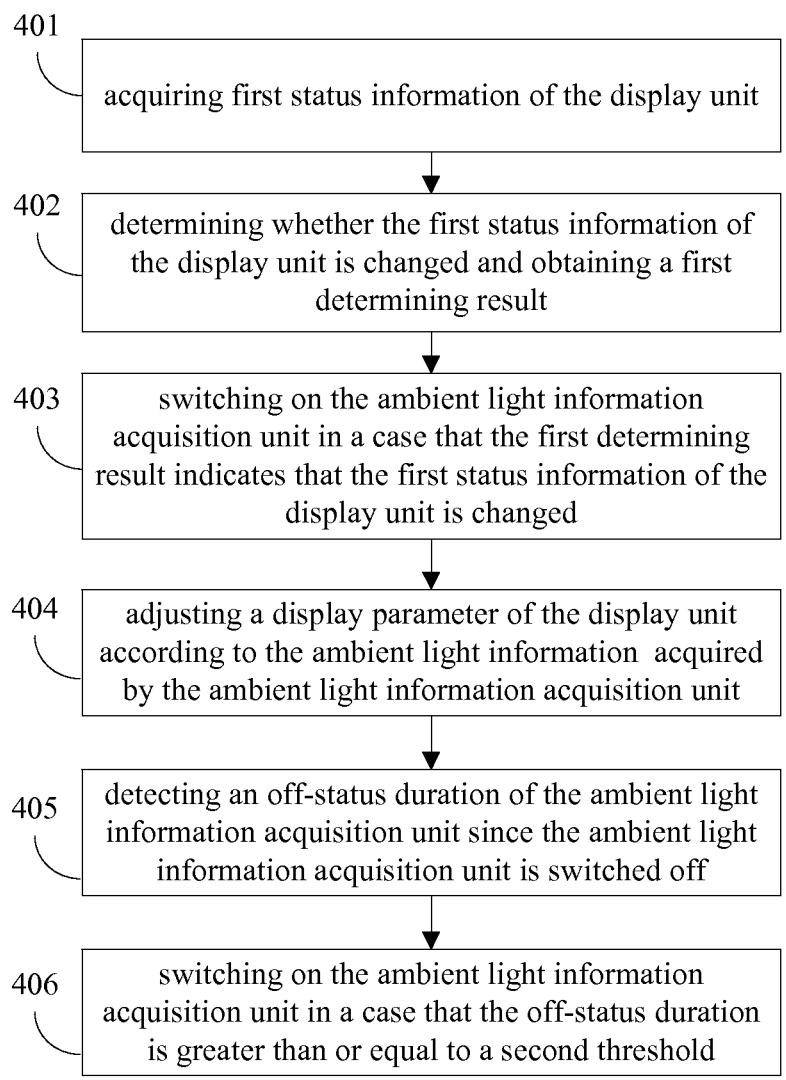
FIG. 4 is a flow chart of a method for adjusting a display unit provided according to the embodiment 4 of the disclosure.

FIG. 4 is a flow chart of a method for adjusting a display unit provided according to the embodiment 4 of the disclosure. As shown in FIG. 4, the method may include steps 401-406.

Step 401 is to acquire first status information of the display unit;

Step 402 is to determine whether the first status information of the display unit is changed and to obtain a first determining result;

Step 403 is to switch on the ambient light information acquisition unit in a case that the first determining result indicates that the first status information of the display unit is changed;

Step 404 is to adjust a display parameter of the display unit according to the ambient light information acquired by the ambient light information acquisition unit;

Step 405 is to detect an off-status duration of the ambient light information acquisition unit since the ambient light information acquisition unit is switched off;

Step 406 is to switch on the ambient light information acquisition unit in a case that the off-status duration is greater than or equal to a second threshold.

As described in the foregoing embodiment, in a case that the display unit is in a moving train or other vehicles, the motion status of the display unit may keep changing all the time, hence the ambient light information acquisition unit may be switched off after a certain duration is elapsed since the ambient light information acquisition unit is switched on.

However, in a case that the display unit is carried by a user in a long journey, the ambient light in a same carriage may vary over time (such as sunrise and sunset). In this case, the method provided according to this embodiment may be adoptable.

In this embodiment, the off-status duration of the ambient light information acquisition unit is detected to avoid the above problems. The ambient light information acquisition unit may be switched on in a case that the off-status duration is greater than or equal to the second threshold. The display parameter of the display unit may still be adjusted according to the change of ambient light information in a case that the ambient light of a same position is changed; hence the user experience may be improved.

A system for adjusting a display unit is provided in this disclosure. The display unit includes an ambient light information acquisition unit.

Figure 5:
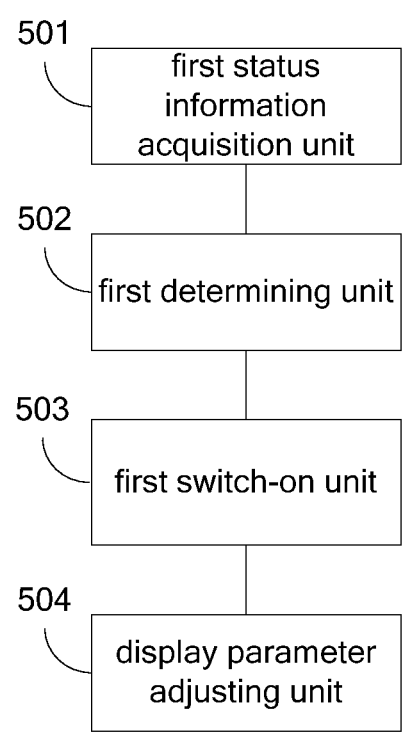
FIG. 5 is a schematic structure diagram of a system for adjusting a display unit provided according to the embodiment 1 of the disclosure.

FIG. 5 is a schematic structure diagram of a system for adjusting a display unit provided according to the embodiment 1 of the disclosure. As shown in FIG. 5, the system may include:

a first status information acquisition unit 501, adapted to acquire first status information of the display unit;

a first determining unit 502, adapted to determine whether the first status information of the display unit is changed and to obtain a first determining result;

a first switch-on unit 503, adapted to switch on the ambient light information acquisition unit in a case that the first determining result indicates that the first status information of the display unit is changed; and a display parameter adjusting unit 504, adapted to adjust a display parameter of the display unit according to ambient light information acquired by the ambient light information acquisition unit.

According to the foregoing embodiments, it may be determined whether the first status information of the display unit is changed. The ambient light information acquisition unit may be switched on only if the first status information of the display unit is changed, and then the display parameter of the display unit may be adjusted according to the ambient light information. Compared with the conventionally technology in which the camera is kept in an on-status all the time, the power consumption of the ambient light information acquisition unit is reduced, hence the power consumption of the device adopting Paper-looking technology may be reduced.

In practice, the first status information acquisition unit 501 may include:

a motion status information acquisition sub-unit, adapted to acquire motion status information of the display unit.

The first determining unit 502 may further include:

a first determining sub-unit, adapted to determine whether the display unit is changed from a static status to a moving status.

The first status information acquisition unit 501 may further include:

a position information acquisition sub-unit, adapted to acquire position information of the display unit.

The display parameter adjusting unit 504 may further include:

a chromaticity information acquisition sub-unit, adapted to acquire chromaticity information of ambient light; and a chromaticity information adjusting sub-unit, adapted to adjust chromaticity information of an image displayed on the display unit according to the chromaticity information of ambient light.

The system may further include:

an on-status duration detecting unit, adapted to detect an on-status duration of the ambient light information acquisition unit since the ambient light information acquisition unit is switched on; and a switch-off unit, adapted to switch off the ambient light information acquisition unit in a case that the on-status duration is greater than or equal to a first threshold.

The system may further include:

an off-status duration detecting unit, adapted to detect an off-status duration of the ambient light information acquisition unit since the ambient light information acquisition unit is switched off; and a second switch-on unit, adapted to switch on the ambient light information acquisition unit in a case that the off-status duration is greater than or equal to a second threshold.

It should be noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

By the foregoing description of the embodiments, those skilled in the art may understand clearly that the present disclosure may be implemented via software and necessary hardware platform, or via the hardware only; in most cases, the former is preferable. In view of this, all or part of the embodiments of the disclosure may be implemented by software product, where the software product may be stored in readable storage medium, such as ROM/RAM, disk or optical disk, and multiple instructions are included in the software product to enable a computer device (personal computer, server or network device) to implement the method provided according to each embodiment or certain part of the embodiment of the disclosure.

The embodiments of the disclosure are described in a progressive way, and each embodiment emphasizes the differences from other embodiments, and the same or similar contents of the embodiments may be referred to each other. Since the system disclosed by the embodiments corresponds to the method disclosed by the embodiments, the description of the system is brief, and for relevant matters references may be made to the description of the method.

Specific examples are set forth to specify the principle and implementation of the disclosure, and the description of the foregoing embodiments is only intended to facilitate understanding the method and core principle of the disclosure. In addition, various modifications to implementations and applications of the embodiments may be made by those skilled in the art based on the spirit of the disclosure. Therefore, the disclosure is not meant to be limited to the specification.

The invention claimed is:

1. A method for adjusting a display unit provided in an electronic device when the electronic device is in an operating state, wherein the display unit comprises an ambient light information acquisition unit, the method comprises:
   acquiring first status information of the display unit;
   determining whether the first status information of the display unit is changed and obtaining a first determining result;
   switching on the ambient light information acquisition unit in a case that the first determining result indicates that the first status information of the display unit is changed;
   adjusting a display parameter of the display unit according to ambient light information acquired by the ambient light information acquisition unit,
   detecting an off-status duration of the ambient light information acquisition unit since the ambient light information acquisition unit is switched off; and
   switching on the ambient light information acquisition unit in a case that the off-status duration is greater than or equal to a second threshold;
   wherein, the process of acquiring first status information of the display unit further comprises:
   acquiring a first speed information of a display unit at a first time; and
   acquiring a second speed information of the display unit at a second time later than the first time;
   wherein, the process of determining whether the first status information of the display unit is changed and obtaining a first determining result comprises:
   determining whether a speed of the display unit is changed and then obtaining a first determining result according to the first and the second speed information.

2. The method for adjusting a display unit according to claim 1, wherein the process of determining whether the first status information of the display unit is changed comprises:
   determining whether the display unit is changed from a static status to a moving status.

3. The method for adjusting a display unit according to claim 1, wherein the process of adjusting the display parameter of the display unit comprises:
   acquiring chromaticity information of ambient light; and
   adjusting chromaticity information of an image displayed on the display unit according to the chromaticity information of ambient light.

4. The method for adjusting a display unit according to claim 1, wherein the method further comprises:
   detecting an on-status duration of the ambient light information acquisition unit since the ambient light information acquisition unit is switched on; and
   switching off the ambient light information acquisition unit in a case that the on-status duration is greater than or equal to a first threshold.

5. A system for adjusting a display unit provided in an electronic device when the electronic device is in an operating state, wherein the display unit comprises an ambient light information acquisition unit, the system comprises:
   a first status information acquisition unit, adapted to acquire first status information of the display unit; and
   a processor adapted to:
   determine whether the first status information of the display unit is changed and to obtain a first determining result;
   switch on the ambient light information acquisition unit in a case that the first determining result indicates that the first status information of the display unit is changed;
   adjust a display parameter of the display unit according to ambient light information acquired by the ambient light information acquisition unit;
   detect an off-status duration of the ambient light information acquisition unit since the ambient light information acquisition unit is switched off; and
   switch on the ambient light information acquisition unit in a case that the off-status duration is greater than or equal to a second threshold;
   wherein, the first status information acquisition unit is further configured to:
   acquire a first speed information of a display unit at a first time; and
   acquire a second speed information of the display unit at a second time later than the first time;
   wherein, the processor is further configured to:
   determine whether a speed of the display unit is changed and then obtaining a first determining result according to the first and the second speed information.

6. The system for adjusting a display unit according to claim 5, wherein the processor is further adapted to determine whether the display unit is changed from a static status to a moving status.

7. The system for adjusting a display unit according to claim 5, wherein the processor is further adapted to:
   acquire chromaticity information of ambient light; and
   adjust chromaticity information of an image displayed on the display unit according to the chromaticity information of ambient light.

8. The system for adjusting a display unit according to claim 5, wherein the processor is further adapted to: detect an on-status duration of the ambient light information acquisition unit since the ambient light information acquisition unit is switched on; and
   switch off the ambient light information acquisition unit in a case that the on-status duration is greater than or equal to a first threshold.

* * * * *